E. BENSON.
CULINARY DEVICE.
APPLICATION FILED APR. 3, 1916.

1,211,051.

Patented Jan. 2, 1917.

Inventor
Ellen Benson

UNITED STATES PATENT OFFICE.

ELLEN BENSON, OF CHICAGO, ILLINOIS.

CULINARY DEVICE.

1,211,051.     Specification of Letters Patent.     Patented Jan. 2, 1917.

Application filed April 3, 1916. Serial No. 88,586.

*To all whom it may concern:*

Be it known that I, ELLEN BENSON, a citizen of the United States, residing at Chicago, in the county of Cook and State of Illinois, have invented new and useful Improvements in Culinary Devices, of which the following is a specification.

The device which is the subject matter of the present application for patent is designed for holding bunches of asparagus or other stalks while they are being cooked, the purpose of the device being to hold the stalks so that they will be boiled whole and will not get broken up and gather in a mass at the bottom of the cooking vessel.

With the object stated in view, the invention consists in a contractile belt of novel and improved construction within which the bunch of stalks is placed and held as will be described hereinafter.

In order that the invention may be better understood, reference is had to the accompanying drawing in which—

Figure 1:
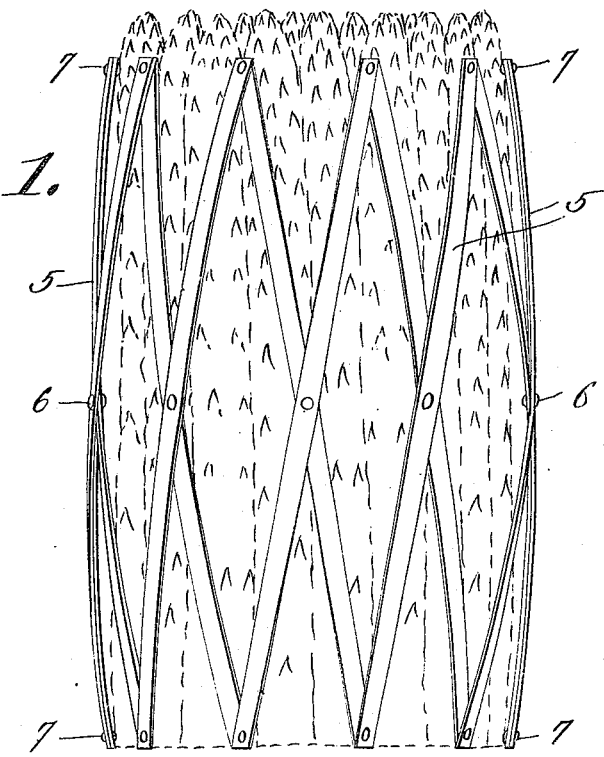
Figure 2:
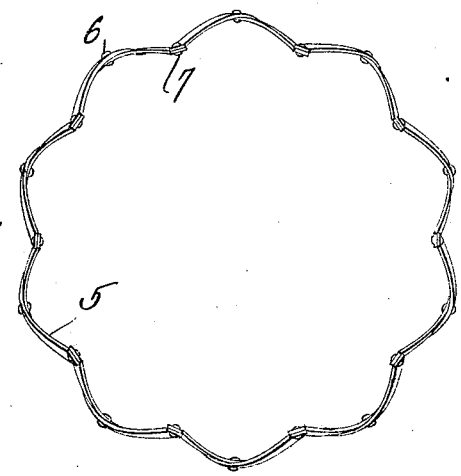

Figure 1 is a side elevation of the device, and Fig. 2 is a plan view thereof.

Referring specifically to the drawing, the device is composed of a belt which may be expanded or contracted to conform to the diameter of the bunch of asparagus or other stalks. The belt consists of a series of bars 5 connected similar to a lazy-tongs structure. The bars are arranged in pairs, the members of which are pivotally connected intermediate their ends, as indicated at 6, and at their outer ends they are pivotally connected as indicated at 7, to the adjacent pairs, the entire series being thus connected to form an endless belt which may be readily expanded or contracted. The bunch of stalks is placed inside the belt, and the latter is then contracted to firmly grip the bunch. The device, with the bunch of stalks held therein, is then placed in the cooking vessel, and the stalks are held so that they will be boiled whole and will not get broken up and gather in a mass at the bottom of the cooking vessel.

The bars 5 are curved in the direction of their length, with their end portions directed inward, and thus adapted to permit the bunch or bundle of stalks inclosed to bulge at its middle portion.

The device is very simple and inexpensive in construction, it can be easily expanded or contracted according to the diameter of the bunch, and it effectually serves the purpose for which it is designed.

I claim:—

A culinary bundle-holding device, comprising an endless belt which is expansible and contractile, said belt being composed of bars which are arranged in pairs pivotally connected at their ends, the members of the respective pairs being pivotally connected intermediate their ends, and said bars being curved in the direction of their length, with their end portions directed inward to permit the bundle inclosed to bulge at its middle portion.

In testimony whereof I affix my signature.

ELLEN BENSON.

Copies of this patent may be obtained for five cents each, by addressing the "Commissioner of Patents, Washington, D. C."